US012519270B2

(12) United States Patent
Henry et al.

(10) Patent No.: US 12,519,270 B2
(45) Date of Patent: Jan. 6, 2026

(54) LATCH AND PULL TAB FOR A PLUG CONNECTOR

(71) Applicants: TE Connectivity Solutions GmbH, Schaffhausen (CH); Tyco Electronics (Shanghai) Co., Ltd., Shanghai (CN)

(72) Inventors: Randall Robert Henry, Lebanon, PA (US); Xinjie Zhang, Jiangsu (CN)

(73) Assignees: TE CONNECTIVITY SOLUTIONS GmbH, Schaffhausen (CH); TYCO ELECTRONICS (SHANGHAI) CO., LTD., Shanghai (CN)

(*) Notice: Subject to any disclaimer, the term of this patent is extended or adjusted under 35 U.S.C. 154(b) by 451 days.

(21) Appl. No.: 17/826,291

(22) Filed: May 27, 2022

(65) Prior Publication Data

US 2023/0369806 A1 Nov. 16, 2023

(51) Int. Cl.
*H01R 13/633* (2006.01)
*H01R 12/72* (2011.01)
*H01R 13/627* (2006.01)
*H01R 12/75* (2011.01)

(52) U.S. Cl.
CPC ......... *H01R 13/633* (2013.01); *H01R 12/724* (2013.01); *H01R 13/627* (2013.01); *H01R 13/6275* (2013.01); *H01R 12/75* (2013.01)

(58) Field of Classification Search
CPC ................ H01R 13/633; H01R 13/627; H01R 13/6275; H01R 12/75; H01R 13/6335; H01R 13/639; H01R 12/724; H01R 3/516; H01R 13/635
See application file for complete search history.

(56) References Cited

U.S. PATENT DOCUMENTS

| | | | | |
|---|---|---|---|---|
| 7,572,138 | B1 * | 8/2009 | Wu | H01R 13/6275 439/352 |
| 9,728,871 | B1 * | 8/2017 | Gutgold | H01R 12/52 |
| 10,236,605 | B1 | 3/2019 | Henry et al. | |
| 10,547,142 | B1 * | 1/2020 | Henry | H01R 12/79 |
| 10,630,022 | B2 | 4/2020 | Yang et al. | |
| 10,770,836 | B2 | 9/2020 | Henry et al. | |

(Continued)

FOREIGN PATENT DOCUMENTS

| | | |
|---|---|---|
| TW | M612510 U | 6/2021 |
| TW | M625826 U | 4/2022 |

OTHER PUBLICATIONS

Taiwanese Office Action with English translation thereof, dated Dec. 6, 2023 in Application No. 112117061, 13 pages.

*Primary Examiner* — Travis S Chambers

(57) ABSTRACT

A plug connector includes a plug housing including a mating end and a cable end oriented perpendicular to the mating end. The plug connector includes a contact assembly having right angle contacts. A latch is coupled to the plug housing having a main body and a latch member extending from the main body. The latch member includes a pivot point. The plug connector includes a pull tab coupled to the main body of the latch at a connection point. The connection point is located forward of a pivot point and above a pivot point. The pull tab pulls on the main body at the connection point to pivot the latch at the pivot point to rotate the main body and the latch member in a downward actuation direction. The pull tab is pulled to release the latching tab from the mating connector.

22 Claims, 5 Drawing Sheets

(56) References Cited

U.S. PATENT DOCUMENTS

| | | | | |
|---|---|---|---|---|
| 10,855,028 | B1 * | 12/2020 | Henry | H01R 13/6272 |
| 11,189,971 | B2 | 11/2021 | Lu | |
| 11,462,856 | B2 | 10/2022 | Phillips et al. | |
| 12,074,396 | B2 | 8/2024 | Henry et al. | |
| 12,095,193 | B2 | 9/2024 | Henry | |
| 2012/0329305 | A1 * | 12/2012 | Ritter | H01R 13/6275 439/350 |
| 2018/0233855 | A1 * | 8/2018 | Phillips | H01R 13/6335 |
| 2020/0076132 | A1 | 3/2020 | Yang et al. | |
| 2021/0408727 | A1 | 12/2021 | Fan et al. | |
| 2023/0238728 | A1 * | 7/2023 | Henry | H01R 13/405 439/676 |
| 2023/0246382 | A1 * | 8/2023 | Henry | H01R 13/6273 439/352 |

* cited by examiner

LATCH AND PULL TAB FOR A PLUG CONNECTOR

CROSS REFERENCE TO RELATED APPLICATIONS

This application claims benefit to Chinese Application No. 202210519006.4, filed 12 May 2022, the subject matter of which is herein incorporated by reference in its entirety.

BACKGROUND OF THE INVENTION

The subject matter herein relates generally to plug connectors.

Electrical connectors are used to electrically connect various components within a communication system. Some systems use receptacle connectors, which may be mounted to a circuit board, and plug connectors, which may be provided at ends of cables. Some known receptacle connectors include card slots that receive paddle cards of the plug connectors. Conductors from cables are terminated to the paddle cards and extend from the paddle cards to another component. The cables extending from the plug connector occupy space exterior of the plug connector, which restricts how close other components may be positioned relative to the receptacle connector and the plug connector. Some known plug connectors orient the cables to extend from the bottom of the plug connector to allow components to be located behind the plug connector. For example, the cables are bent within the interior chamber of the plug connector toward the bottom to extend from the bottom. Such plug connectors have long overall lengths. Additionally, latching components may extend from the plug connector housing, such as from the rear of the housing, which increase the overall length of the plug connector. Unlatching the latch may be problematic.

BRIEF DESCRIPTION OF THE INVENTION

In one embodiment, a plug connector is provided and includes a plug housing including a mating end and a cable end. The cable end is oriented perpendicular to the mating end. The plug connector includes a contact assembly coupled to the plug housing. The contact assembly includes an array of contacts. Each contact includes a mating end and a terminating end. Each contact is a right angle contact having the terminating end being perpendicular to the mating end. The mating end is configured to be mated with a mating connector. The terminating end is configured to be terminated to an end of a conductor of a cable. The plug connector includes a latch coupled to the plug housing. The latch includes a main body and a latch member extending from the main body. The latch member includes a latching tab configured to be latchably coupled to the mating connector to secure the plug connector to the mating connector. The latch member includes a pivot point. The plug connector includes a pull tab coupled to the main body of the latch at a connection point. The connection point is located forward of a pivot point and above a pivot point. The pull tab pulls on the main body at the connection point to pivot the latch at the pivot point to rotate the main body and the latch member in a downward actuation direction. The pull tab is pulled to release the latching tab from the mating connector.

In another embodiment, a plug connector is provided and includes a plug housing including a mating end and a cable end. The cable end is oriented perpendicular to the mating end. The plug housing includes a latch chamber and a pull tab chamber extending from the latch chamber. The plug connector includes a contact assembly coupled to the plug housing. The contact assembly includes an array of contacts. Each contact includes a mating end and a terminating end. Each contact is a right angle contact having the terminating end being perpendicular to the mating end. The mating end is configured to be mated with a mating connector. The terminating end is configured to be terminated to an end of a conductor of a cable. The plug connector includes a latch received in the latch chamber. The latch includes a main body and a latch member extending from the main body. The latch member includes a latching tab configured to be latchably coupled to the mating connector to secure the plug connector to the mating connector. The plug connector includes a pull tab received in the pull tab chamber. The pull tab extending within an interior of the plug housing. The pull tab is coupled to the main body of the latch. The pull tab is pulled to release the latching tab from the mating connector.

In a further embodiment, a plug connector is provided and includes a plug housing including a mating end at a front of the plug housing and a cable end at a bottom of the plug housing. The cable end is oriented perpendicular to the mating end. The plug housing includes a latch chamber at a top of the plug housing. The plug connector includes a contact assembly coupled to the plug housing. The contact assembly includes an array of contacts. Each contact includes a mating end and a terminating end. Each contact is a right angle contact having the terminating end being perpendicular to the mating end. The mating end is configured to be mated with a mating connector at the mating end of the plug housing. The terminating end is configured to be terminated to an end of a conductor of a cable extending from the cable end of the plug housing. The plug connector includes a latch coupled received at the latch chamber of the plug housing. The latch includes a main body and a latch member extending from the main body. The latch member includes a pivot point. The latch member includes a latching tab at the top of the plug housing. The latching tab is configured to be latchably coupled to the mating connector to secure the plug connector to the mating connector. The plug connector includes a pull tab coupled to the main body of the latch. The pull tab includes a latch connection portion connected to the main body of the latch at a connection point. The connection point is located forward of the pivot point and above the pivot point. The pull tab includes a pulling portion extending from the latch connection portion. The pulling portion of the pull tab is pulled in a rearward pulling direction to rotate the latch connection portion in a latch actuation direction generally perpendicular to the pulling direction. The latch connection portion moves the latch in a releasing direction when the pulling portion is pulled in the rearward pulling direction to release the latching tab from the mating connector.

DETAILED DESCRIPTION OF THE INVENTION

Figure 1:
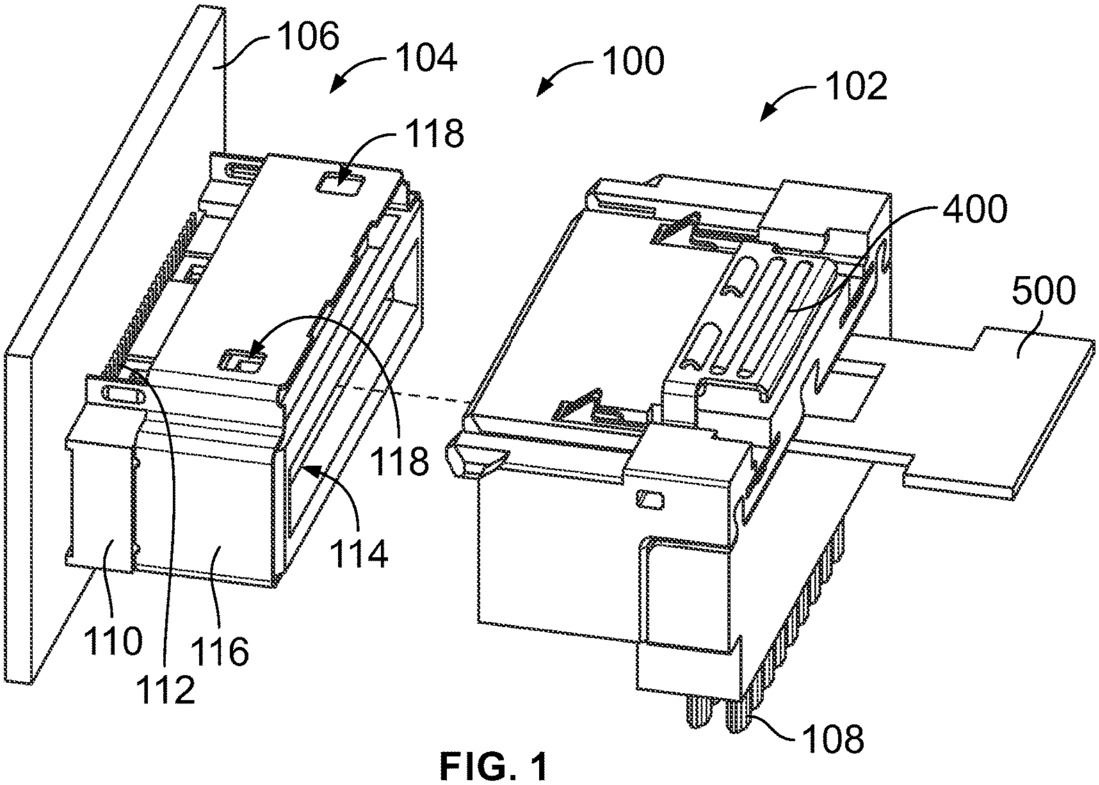
FIG. 1 illustrates an electrical connector system in accordance with an exemplary embodiment.

FIG. 1 illustrates an electrical connector system 100 in accordance with an exemplary embodiment. The electrical connector system 100 includes a plug connector 102 and a mating connector 104 that receives the plug connector 102. The mating connector 104 may be a receptacle connector and referred to hereinafter as a receptacle connector 104. In the illustrated embodiment, the receptacle connector 104 is mounted to a circuit board 106. However, in alternative embodiments, the receptacle connector 104 may be a cable connector. In an exemplary embodiment, the plug connector 102 is a cable connector having a plurality of cables 108 exiting the plug connector 102. In an exemplary embodiment, the plug connector 102 is a right angle connector having the cables 108 exiting the plug connector 102 in a direction perpendicular to the mating direction with the receptacle connector 104.

The plug connector 102 includes a latch 400 and a pull tab 500 operably coupled to the latch 400 used to actuate and release the latch 400. The latch 400 is configured to latchably couple the plug connector 102 to the receptacle connector 104. The latch 400 is a deflectable latch movable between a latched position and an unlatched position. For example, the latch 400 may be depressed (pressed downward) to unlatch the latch 400 from the receptacle connector 104 or the pull tab 500 may be pulled to unlatch the latch 400 from the receptacle connector 104. In an exemplary embodiment, the plug connector 102 has a low profile from the mating end. For example, neither the cables 108 nor the latch 400 extend beyond the rear of the plug housing of the plug connector 102. Both the cables 108 and the latch 400 are located forward of the rear of the plug housing of the plug connector 102 such that other components may be located rearward of the plug connector 102. The cables 108 and the latch 400 do not interfere with such other components rearward of the plug connector 102. The pull tab 500 is flexible and may be easily routed away from the plug housing without interfering with other components rearward of the plug connector 102.

The receptacle connector 104 includes a receptacle connector housing 110 holding a plurality of receptacle connector contacts 112. In an exemplary embodiment, the receptacle connector housing 110 includes a slot 114 at a mating end of the receptacle connector housing 110 that receives the plug connector 102. The receptacle connector contacts 112 are arranged within the slot 114 for mating with the plug connector 102. The slot 114 may be a card slot. The slot 114 is elongated, such as being rectangular shaped. The receptacle connector contacts 112 are located along the top and the bottom of the slot 114 in an exemplary embodiment. In various embodiments, the receptacle connector contacts 112 are deflectable contacts having spring beams configured to be mated with the plug connector 102 when the plug connector 102 is plugged into the slot 114. Other types of contacts may be provided in alternative embodiments.

In an exemplary embodiment, the receptacle connector 104 includes a mating shroud 116 surrounding the receptacle connector housing 110. In the illustrated embodiment, the mating shroud 116 is a stamped and formed component separate and discrete from the receptacle connector housing 110. In alternative embodiments, the mating shroud 116 may be integral with the receptacle connector housing 110, such as being molded with the receptacle connector housing 110. The mating shroud 116 may be mated to the circuit board 106. The mating shroud 116 includes a receiving space configured to receive a portion of the plug connector 102. In the illustrated embodiment, the receiving space is located above a top of the receptacle connector housing 110. The mating shroud 116 includes latch openings 118 configured to receive latching elements of the latch 400 to secure the plug connector 102 to the receptacle connector 104.

Figure 2:
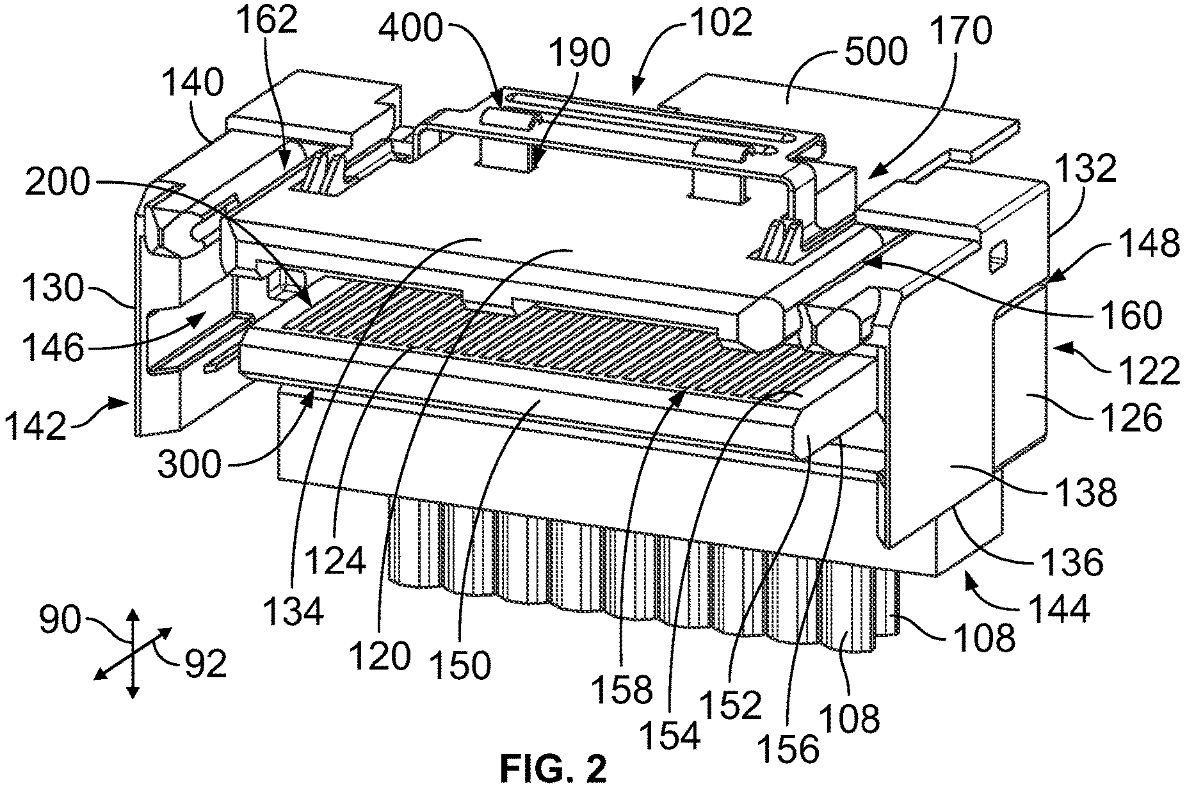
FIG. 2 is a front perspective view of the plug connector in accordance with an exemplary embodiment.

FIG. 2 is a front perspective view of the plug connector 102 in accordance with an exemplary embodiment. The plug connector 102 includes a plug housing 120 holding a contact assembly 122. The contact assembly 122 includes an array of contacts 124 configured to be electrically connected to the receptacle connector contacts 112 (shown in FIG. 1). The cables 108 are terminated to corresponding contacts 124. In an exemplary embodiment, the contact assembly 122 includes an upper module 200 and a lower module 300. The upper module 200 includes corresponding upper contacts and upper cables and the lower module 300 includes corresponding lower contacts and lower cables. The upper module 200 is positioned in an upper portion of the plug housing 120 and the lower module 300 is positioned in a lower portion of the plug housing 120. Utilizing the upper and lower modules 200, 300 increases contact density within the plug connector 102 compared to the plug connector 102 including a single set of contacts and cables.

In an exemplary embodiment, the contacts 124 are formed by one or more leadframes (for example, one leadframe for the upper module 200 and one leadframe for the lower module 300). In various embodiments, the contacts 124 are stamped and formed contacts (for example, all contacts within the leadframe stamped during a single stamping process and then formed to have a particular shape, such as including one or more bends). In an exemplary embodiment, the contacts 124 are right-angle contacts having right-angle bends. The right-angle contacts allow the cables 108 to extend from the plug housing 120 in a direction perpendicular to the mating direction with the receptacle connector 104 without the cables needing to be bent. The cables 108 extend straight from the right-angle contacts 124 to the exterior of the plug housing 120. The cables 108 are not bent 90° within the plug housing 120. As such, the plug housing 120 may be made relatively smaller, thus having a low-profile (narrow depth from front to rear), compared to plug connectors that accommodate 90° cable bends within the plug housing. In an exemplary embodiment, the contacts 124 may be arranged in multiple rows, such as an upper row and a lower row. In an exemplary embodiment, the cables 108 may be arranged in multiple rows, such as a front row and a rear row, corresponding to the multiple rows of contacts 124.

The plug housing 120 extends between a front 130 and a rear 132. The plug housing 120 has a top 134 and a bottom 136. The plug housing 120 has a first side 138 and a second side 140. In the illustrated embodiment, the front 130 defines a mating end 142 of the plug housing 120 and the bottom 136 defines a cable end 144 of the plug housing 120. The cable end 144 is generally perpendicular to the mating end 142. The cables 108 extend into the plug housing 120 at the cable end 144. The cables 108 extend along a first axis 90, which, in the illustrated embodiment, is a vertical axis. The mating end 142 is configured to be mated with the receptacle connector 104 in a mating direction along a second axis 92, which, in the illustrated embodiment, is a horizontal axis.

In an exemplary embodiment, the latch 400 is located at the top 134 of the plug housing 120, such as at the rear 132. The latch 400 may be actuated by moving the latch 400 downward (for example, along the first axis 90) to release the latching elements of the latch 400 from the receptacle connector 104 (shown in FIG. 1). In an exemplary embodiment, the pull tab 500 extends from the rear 132 of the plug housing 120. The pull tab 500 may be pulled rearward (for example, along the second axis 92) to pull the latch 400 downward in the actuation direction.

In an exemplary embodiment, the plug housing 120 includes a mating chamber 146 at the mating end 142. The contacts 124 of the contact assembly 122 extend into the mating chamber 146 for mating with the receptacle connector 104. The mating chamber 146 may be open at the front 130 for mating with the receptacle connector 104.

In an exemplary embodiment, the plug housing 120 includes a cable chamber 148 at the cable end 144. The cables 108 extend into the cable chamber 148. The contact assembly 122 is received in the cable chamber 148 for termination to the cables 108. The cable chamber 148 may be open at the bottom 136 to receive the cables 108. The cable chamber 148 may be open at the rear 132 to receive the contact assembly 122. For example, during assembly, the contact assembly 122 is loaded into the cable chamber 148 through the rear 132 and a portion of the contact assembly 122 and the cables 108 extend from the bottom 136. In an exemplary embodiment, the contact assembly 122 includes a contact assembly holder 126 holding the contacts 124 and/or the cables 108. The contact assembly holder 126 holds the contacts 124 and cables 108 of the upper module 200 and the contacts 124 and cables 108 of the lower module 300. The contact assembly holder 126 may be loaded into the plug housing 120, such as into the cable chamber 148. The contact assembly holder 126 holds relative positions of the contacts 124 and the cables 108 to allow loading of all of the contacts 124 and the cables 108 into the plug housing 120 as a single unit. However, the contacts 124 and/or the cables 108 may be loaded into the plug housing 120 individually rather than as a unit in alternative embodiments.

In an exemplary embodiment, the plug housing 120 includes a latch chamber 170 that receives the latch 400. In the illustrated embodiment, the latch chamber 170 is provided at the top 134 of the plug housing 120 to locate the latch 400 at the top 134. In an exemplary embodiment, the latch 400 is configured to be loaded into the latch chamber 170 through the rear 132. The latch chamber 170 may be open at the top 134 to provide access to the latch 400. The latch 400 may be actuated from above, such as by pressing downward on the latch to move the latch 400 from a latched position to an unlatched position. The pull tab 500 is coupled to the latch 400 and pulls downward on the latch 400 when the pull tab is operated.

In an exemplary embodiment, the plug housing 120 includes a pull tab chamber 190 that receives the pull tab 500. In the illustrated embodiment, the pull tab chamber 190 extends between the top 134 and the rear 132 of the plug housing 120. The pull tab 500 passes through the pull tab chamber 190 to interface with the latch 400. The pull tab 500 extends from the interior of the plug housing 120 to the exterior of the plug housing 120. The pull tab 500 extends rearward from the plug housing 120 for access by the operator to pull rearward on the pull tab 500 to actuate and release the latch 400. The pull tab 500 is coupled to the latch 400 and pulls downward on the latch 400 when the pull tab is operated.

In an exemplary embodiment, the plug housing 120 includes a plug nose 150 in the mating chamber 146. The plug nose 150 is configured to be plugged into the slot 114 of the receptacle connector 104 (shown in FIG. 1). In an exemplary embodiment, the plug nose 150 includes an elongated tray 152 used to support the contacts 124. The plug nose 150 includes an upper surface 154 and a lower surface 156. In an exemplary embodiment, the contacts 124 of the upper module 200 extend along the upper surface 154 and the contacts 124 of the lower module 300 extend along the lower surface 156 for mating with the receptacle connector contacts 112 (shown in FIG. 1). In an exemplary embodiment, the plug nose 150 includes pockets 158 along the upper surface 154 and the lower surface 156 that receive the contacts 124. As such, the contacts 124 may be generally flush with the upper surface 154 and the lower surface 156. In various embodiments, the plug nose 150 is integral with the plug housing 120. For example, the plug nose 150 is co-molded with the plug housing 120. In other various embodiments, the plug nose 150 may be formed separate and discrete from the plug housing 120 and coupled to the plug housing 120. For example, the plug nose 150 may be preassembled with the contact assembly 122 and loaded into the plug housing 120 with the contact assembly 122

The plug connector 102 includes one or more guide features 160 to guide mating with the receptacle connector 104. For example, the guide features 160 may include slots 162 that receive a portion of the receptacle connector 104 to position the plug connector 102 relative to the receptacle connector 104 during mating. Other types of guide features may be used in alternative embodiments, such as rails, tabs, pins, and the like. In an exemplary embodiment, the plug connector 102 may include a securing feature, such as a latch (not shown), for latchably securing the plug connector 102 to the receptacle connector 104.

Figure 3:
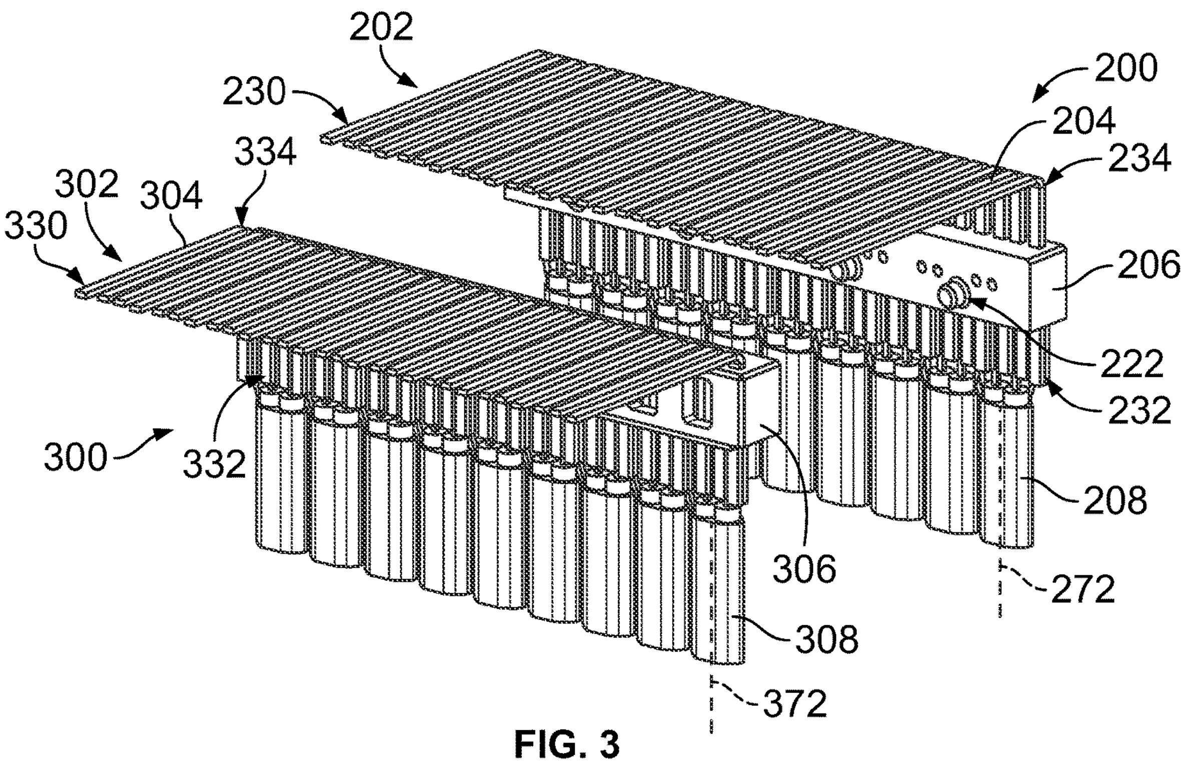
FIG. 3 is a front perspective view of a portion of the contact assembly showing the upper module and the lower module in accordance with an exemplary embodiment.

FIG. 3 is a front perspective view of a portion of the contact assembly 122 showing the upper module 200 and the lower module 300 in accordance with an exemplary embodiment. The upper module 200 is configured to be coupled to the lower module 300 to form the contact assembly 122. In an exemplary embodiment, the upper module 200 may be similar to the lower module 300; however, sizes and shapes of components of the upper module 200 may be different from the lower module 300.

The upper module 200 includes an upper contact array 202 of upper contacts 204. The upper module 200 includes an upper contact holder 206 holding the upper contacts 204. The upper module 200 includes upper cables 208 terminated to the upper contacts 204. In an exemplary embodiment, the upper contact array 202 is formed from a stamped lead frame. For example, all of the upper contacts 204 may be stamped from a common sheet of metal material.

The upper contact holder 206 is manufactured from a dielectric material. In an exemplary embodiment, the upper contact holder 206 is overmolded around the upper contacts 204 to hold relative positions of the upper contacts 204. In the illustrated embodiment, the upper contact holder 206 is generally box shaped; however, the upper contact holder 206 may have other shapes in alternative embodiments. In an exemplary embodiment, the upper contact holder 206 includes securing features 222 at the front 210 used to secure the upper contact holder 206 to the lower module 300. The securing features 222 may include posts and/or openings configured to be mated with corresponding securing features of the lower module 300.

In an exemplary embodiment, the upper contacts 204 are bent into a right-angle configuration during manufacture, such as after the upper contact holder 206 is coupled to the upper contacts 204. Each upper contact 204 includes a mating end 230 and a terminating end 232. A transition portion 234 is provided between the mating end 230 and the terminating end 232. The upper contact 204 is configured to be bent at the transition portion 234. The mating end 230 is configured to be mated with the receptacle connector contacts 112 (shown in FIG. 1). In various embodiments, the mating end 230 includes a mating pad defining a mating interface for the upper contact 204. The mating pad may be planar and flat for mating with the receptacle connector contact 112. The mating pad is configured to extend along the plug nose 150 (shown in FIG. 2) for connection to the receptacle connector contact 112. The upper cables 208 are configured to be terminated to the terminating ends 232. For example, the upper cables 208 may be soldered to the terminating ends 232. In various embodiments, the terminating end 232 includes a solder pad. The solder pad is generally planar and forms a surface to receive a portion of the upper cables 208 and soldered to create an electrical connection between the upper cable 208 and the upper contact 204.

In an exemplary embodiment, the upper contacts 204 include signal contacts and ground contacts. The ground contacts provide electrical shielding for the signal contacts. In an exemplary embodiment, the signal contacts may be arranged in pairs and the ground contacts may be arranged between the pairs of signal contacts. In various embodiments, a ground bus electrically connects the ground contacts to electrically common all of the ground contacts.

In an exemplary embodiment, each upper cable 208 is a twin-axial cable. The upper cable 208 includes a pair of conductors configured to be electrically connected to corresponding signal contacts. In an exemplary embodiment, the upper cable 208 includes a cable shield providing electrical shielding for the conductors.

The lower module 300 includes a lower contact array 302 of lower contacts 304. The lower module 300 includes a lower contact holder 306 holding the lower contacts 304. The lower module 300 includes lower cables 308 terminated to the lower contacts 304. In an exemplary embodiment, the lower contact array 302 is formed from a stamped leadframe, which may be different from the stamped leadframe of the upper module 200. For example, all of the lower contacts 304 may be stamped from a common sheet of metal material.

The lower contact holder 306 is manufactured from a dielectric material. In an exemplary embodiment, the lower contact holder 306 is overmolded around the lower contacts 304 to hold relative positions of the lower contacts 304. The lower contact holder 306 is configured to be coupled to the upper contact holder 206, such as using the securing features 222 and complimentary securing features on the lower contact holder 306. The securing features may be connected by an interference fit.

In an exemplary embodiment, the lower contacts 304 include signal contacts and ground contacts. Each lower contact 304 includes a mating end 330 and a terminating end 332. A transition portion 334 is provided between the mating end 330 and the terminating end 332. The lower contacts 304 are bent into a right-angle configuration at the transition portion 334 such that the lower mating end 330 is perpendicular to the lower terminating end 332. The lower cables 308 are terminated to the terminating ends 332. Lengths of the mating ends 330 and/or the terminating ends 332 may be shorter than the mating ends 230 and/or the terminating ends 232.

In an exemplary embodiment, each lower cable 308 is a twin-axial cable. The lower cable 308 includes a pair of conductors configured to be electrically connected to corresponding signal contacts. In an exemplary embodiment, the lower cable 308 includes a cable shield providing electrical shielding for the conductors.

When assembled, the upper module 200 is coupled to the lower module 300. The contact holders 206, 306 hold the relative positions of the contacts 204, 304. The upper contacts 204 are located in an upper row and the lower contacts 304 are located in a lower row. The upper mating ends 230 of the upper contacts 204 are located above the lower mating ends 330 of the lower contacts 304. The upper terminating ends 232 of the upper contacts 204 are located rearward of the lower terminating ends 332 of the lower contacts 304. The upper cables 208 are located rearward of the lower cables 308. The upper cables 208 extend along linear cable axes 272. The lower cables 308 extend along linear cable axes 372, which are parallel to the cable axes 272. The upper cables 208 are arranged in a row with the linear cable axes 272 parallel to each other. The lower cables 208 are arranged in a row with the linear cable axes 372 parallel to each other and parallel to the upper cables 208. The upper and lower cables 208, 308 extend straight downward from the terminating ends 232, 332. The upper and lower cables 208, 308 do not have bends. Rather, the upper and lower contacts 204, 304 have 90° bends to transition between the mating end and the cable end of the contact assembly 122. As such, the front-to-rear dimension may be relatively short compared to contact assemblies having planar contacts with cables bent 90° to form the right angle transition. In various embodiments, use of the right-angle contacts to form the right angle transition (compared to use of the cables to form the right angle transition) may reduce the front-to-rear dimension by approximately half.

Figure 4:
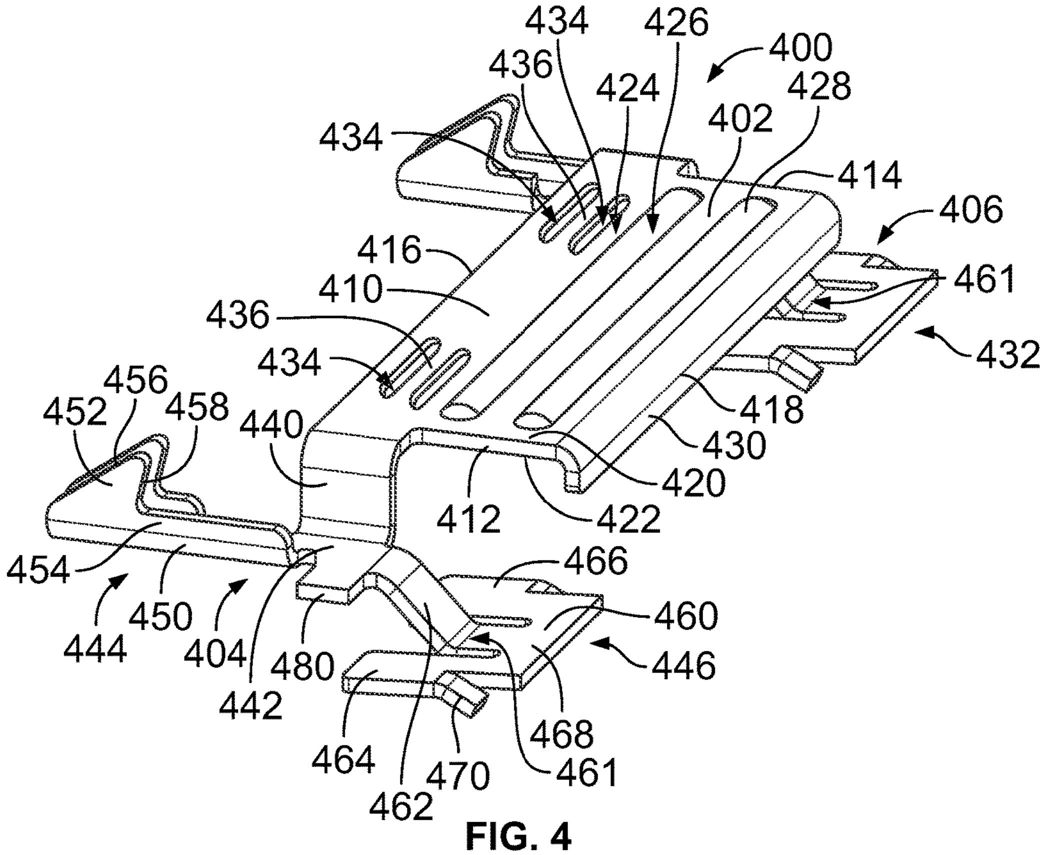
FIG. 4 is a perspective view of the latch in accordance with an exemplary embodiment.

FIG. 4 is a perspective view of the latch 400 in accordance with an exemplary embodiment. In an exemplary embodiment, the latch 400 is stamped and formed from a piece of sheet metal. The latch 400 is a single, unitary, monolithic structure configured to be latchably coupled to the receptacle connector 104 (shown in FIG. 1).

The latch 400 includes a main body 402, a first latch member 404 extending from the main body 402 at a first side of the latch 400, and a second latch member 406 extending from the main body 402 at a second side of the latch 400. While the latch 400 is illustrated including a pair of the latch members 404, 406, the latch 400 may include greater or fewer latch members in alternative embodiments. The latch members 404, 406 may be similar to each other and include similar components. The first latch member 404 is described in detail below and it is recognized that the second latch member 406 may include like components identified with like reference numerals.

The main body 402 includes a plate 410 extending between a first side 412 and a second side 414. The plate 410 extends between a front 416 and a rear 418. The plate 410 has a top 420 and a bottom 422. In the illustrated embodiment, the main body 402 is generally rectangular; however, the main body 402 may have other shapes in alternative embodiments. In an exemplary embodiment, the main body 402 defines an actuator 424 of the latch 400. For example, the plate 410 includes a press button 426 defining the actuator 424 that is configured to be depressed downward to actuate the latch 400 and move the latch members 404, 406 to an unlatched position. The plate 410 includes bumps or ribs 428 along the top 420 forming part of the press button 426. The ribs 428 define a finger grip engaged by the operator finger to actuate the latch 400.

In an exemplary embodiment, the main body 402 includes a lip 430 along the rear 418 of the plate 410. The main body 402 may additionally or alternatively include the lip 430 at the front 416 of the plate 410. The lip 430 is bent perpendicular to the plate 410. For example, the lip 430 may be folded downward (or upward) relative to the plate 410. The lip 430 provide structural rigidity for the main body 402. In an exemplary embodiment, the lip 430 defines a rear 432 of the latch 400. The lip 430 is the rearward most structure of the latch 400.

The main body 402 includes one or more openings 434 configured to receive the pull tab 500 (shown in FIG. 1). A connecting beam 436 extends into the opening 434. The pull tab 500 is configured to be coupled to the connecting beam 436. For example, the pull tab 500 may be wrapped or looped around the connecting beam 436. In the illustrated embodiment, the openings 434 are located near the front 416 of the main body 402. As such, the pull tab 500 may be coupled to the front 416 of the main body 402 to pull downward on the front of the main body 402 to unlatch the latch 400. In the illustrated embodiment, the main body 402 includes two of the openings 434, which are located proximate to the first and second sides 412, 414, respectively. The connecting beams 436 may extend entirely across the openings 434. In other embodiments, the openings 434 may be provided without the connecting beams 436. Other types of connecting elements may be used in alternative embodiments to connect the pull tab 500 to the latch 400, such as clips, fasteners, weld pads, epoxy pads, or other types of connecting elements.

The latch member 404 extends from the main body 402. In an exemplary embodiment, the latch member 404 extends from the first side 412 of the plate 410. The latch member 404 includes a connecting beam 440 extending between the main body 402 and an elongated member 442 of the latch member 404. The latch member 404 includes a latching portion 444 forward of the connecting beam 440 and a supporting portion 446 rearward of the connecting beam 440.

The latching portion 444 includes a latch arm 450 and one or more latching tabs 452 extending from the latch arm 450. The latching tabs 452 are configured be received in the latch openings 118 (shown in FIG. 1) of the mating shroud 116 (shown in FIG. 1) to latchably secure the plug connector 102 to the receptacle connector 104. In an exemplary embodiment, the latch arm 450 includes a pair of sidewalls 454 folded upward from the elongated member 442. The sidewalls 454 and structural rigidity to the latch arms 450. The latching tabs 452 extend from the upper surfaces of the sidewalls 454. In an exemplary embodiment, the latching portion 444 includes a pair of the latching tabs 452 to increase the latching strength of the latching portion 444. For example, both latching tabs 452 are configured be received in the same latch opening 118. Each latching tab 452 includes a ramp 456 at the front of the latching tab 452 and a catch surface 458 and a rear of the latching tab 452. The ramp 456 is angled to form a wedge shaped latching tab 452. In an exemplary embodiment, the catch surface 458 is undercut to form a pocket that receives the mating shroud 116 of the receptacle connector 104. The catch surface 458 is configured to engage the mating shroud 116 of the receptacle connector 104 in the latch opening 118 to retain the plug connector 102 in the receptacle connector 104.

The supporting portion 446 includes a securing base 460 and a support beam 462. The support beam 462 is the rearward portion of the elongated member 442. In an exemplary embodiment, the support beam 462 includes one or more bends such that the support beam 462 is angled and non-coplanar with the latch arm 450. For example, the support beam 462 may be bent downward, such as at a 45° angle, relative to the latch arm 450. The support beam 462 extends between the connecting beam 440 and the securing base 460. In an exemplary embodiment, the latch member 404 is deflectable at the support beam 462. For example, the support beam 462 may be deflected relative to the securing base 460 at the latch 400 moves between the latched position and the unlatched position. In various embodiments, the support beam 462 may be rotated or pivoted, when deflected, at a pivot point 461 defined at the intersection between the support beam 462 and the securing base 460. The latch arm 450 is movable relative to the securing base 460 with the support beam 462. For example, when the actuator 424 is actuated (for example, pressed downward or pulled downward by the pull tab 500) the latch arm 450 is pivoted at the pivot point 461 and the movement is transitioned from the main body 402 to the latch member 404 through the connecting beam 440 and the support beam 462.

In an exemplary embodiment, the securing base 460 is generally planar and oriented generally parallel to the plate 410 of the main body 402. For example, the securing base 460 may be oriented generally horizontally. In an exemplary embodiment, the support beam 462 extends from a center of the securing base 460. The securing base 460 includes a first support tab 464 along a first side of the support beam 462 and a second support tab 466 along a second side of the support beam 462. The securing base 460 includes a rear connecting beam 468 between the first and second support tabs 464, 466. The support beam 462 extends forward from the rear connecting beam 468 and eventually transitions out of plane relative to the securing base 460. In an exemplary embodiment, the securing base 460 includes one or more lances 470 extending from the securing base 460. The lances 470 may extend from the first and second support tabs 464, 466. The lances 470 are bent out of plane relative to the securing base 460. For example, the lances 470 may be bent downward. The lances 470 are used to secure the securing base 460 in the plug housing 120 (shown in FIG. 2).

In an exemplary embodiment, the latch member 404 includes a preload tab 480 configured to position the latch 400 relative to the plug housing 120. In the illustrated embodiment, the preload tab 480 extends outward from the elongated member 442; however, the preload tab 480 may be at other locations in alternative embodiments. The preload tab 480 is used to partially deflect the latch 400 within the plug housing 120 and create an internal preload biasing force within the structure of the latch 400. For example, when the support beam 462 is deflected, the support beam 462 is elastically deformed creating an internal biasing force tending to return the support beam 462 to the undeflected position. In the illustrated embodiment, the support beam 462 is forced downward when actuated to the unlatched position creating an internal biasing force in an upward direction tending to return the latch member 404 to the latched position. Even when partially deflected, the internal biasing force tends to return the latch member 404 upward.

Such preloading of the latch member 404 is used to normally position the latch member 404 in the latched position.

Figure 5:
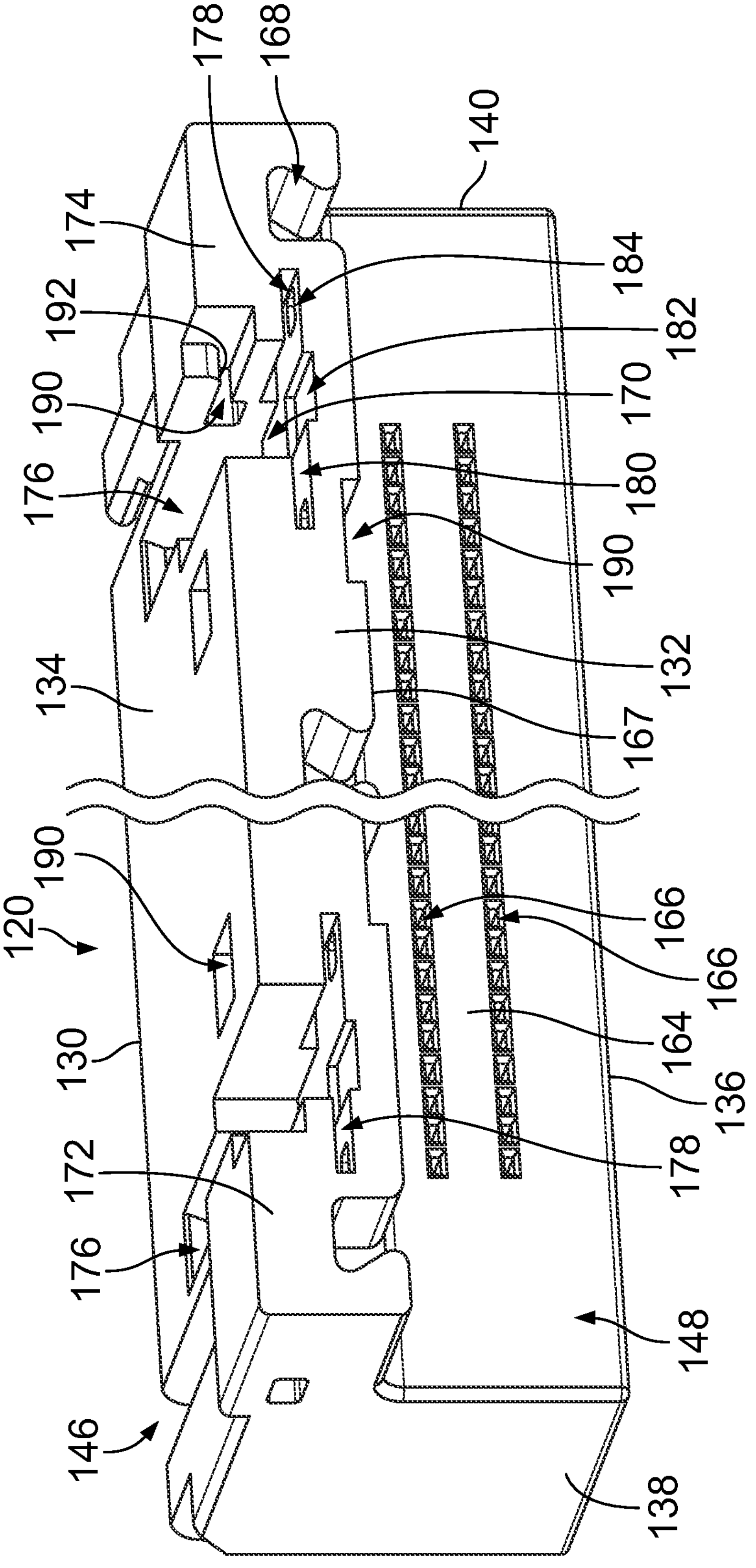
FIG. 5 is a rear perspective view of the plug housing in accordance with an exemplary embodiment.

FIG. 5 is a rear perspective view of the plug housing 120 in accordance with an exemplary embodiment. The top 134 of the plug housing 120 extends between the front 130 and the rear 132. The latch chamber 170 is located at the top 134 to receive the latch 400 (shown in FIG. 4). The latch chamber 170 is open at the top 134 between a first latch mounting block 172 at the first side 138 and a second latch mounting block 174 at the second side 140. In an exemplary embodiment, the latch chamber 170 is open at the rear 132 such that the latch 400 is configured to be loaded into the latch chamber 170 through the rear 132. The pull tab chamber 190 extends through the interior of the plug housing 120.

The latch chamber 170 includes latching portion channels 176 configured to receive the latching portions 444 of the latch members 404, 406 and supporting portion channels 178 configured to receive the supporting portions 446 of the latch members 404, 406. In the illustrated embodiment, the supporting portion channels 178 are provided at the rear 132 and the latching portion channels 176 are located forward of the supporting portion channels 178.

The latching portion channels 176 provide a clearance space for the latch arms 450 and the latching tabs 452 as the latch members 404, 406 move between the latched position and the unlatched position. For example, the latch arms 450 and the latching tabs 452 may be moved into the latching portion channels 176 when the latch members 404, 406 are moved to the unlatched position.

The supporting portion channels 178 are configured to receive the securing base 460 and the support beams 462. In an exemplary embodiment, each of the supporting portion channels 178 includes a base pocket 180 configured to receive the securing base 460, a beam pocket 182 configured to receive the support beam 462, and one or more lance pockets 184 configured to receive the lances 470. The supporting portion channels 178 may include additional pockets or features in alternative embodiments.

In an exemplary embodiment, the latch chamber 170 includes preload windows 186, such as in the first and second latch mounting blocks 172, 174. The preload windows 186 are configured to receive corresponding preload tabs 480. In an exemplary embodiment, the latch chamber 170 includes guide rails 188 configured to guide the preload tabs 480 into the preload windows 186. The preload windows 186 in the guide rails 188 may be accessible from the rear 132 of the plug housing 120.

In an exemplary embodiment, the plug housing 120 includes a wall 164 between the mating chamber 146 and the cable chamber 148. In the illustrated embodiment, the wall 164 has a vertical orientation. The plug nose 150 (shown in FIG. 2) extends forward of the wall 164 into the mating chamber 146. The wall 164 includes a plurality of contact channels 166 extending therethrough. The contact channels 166 are configured to receive the mating ends of the contacts 124 (shown in FIG. 2). The contacts 124 may be loaded into the contact channels 166 from behind the wall 164, such as from the cable chamber 148. In the illustrated embodiment, the contact channels 166 are arranged in an upper row and a lower row.

In an exemplary embodiment, the cable chamber 148 is open at the rear 132 to receive the contact assembly 122 (shown in FIG. 3). An upper wall 167 extends above the cable chamber 148. The latch chamber 170 and the pull tab chamber 190 are provided in the upper wall 167. In an exemplary embodiment, the cable chamber 148 is open at the bottom 136 to allow the contact assembly 122 and/or the cables 108 to extend from the bottom 136 of the plug housing 120. Optionally, the cable chamber 148 may be open at the sides 138, 140. The plug housing 120 includes securing features 168 for securing the contact assembly 122 in the cable chamber 148. In the illustrated embodiment, the securing features 168 are pockets formed in the upper wall of the plug housing 120. The pockets may be dovetailed pockets in various embodiments. Other types of securing features may be used in alternative embodiments.

Figure 6:
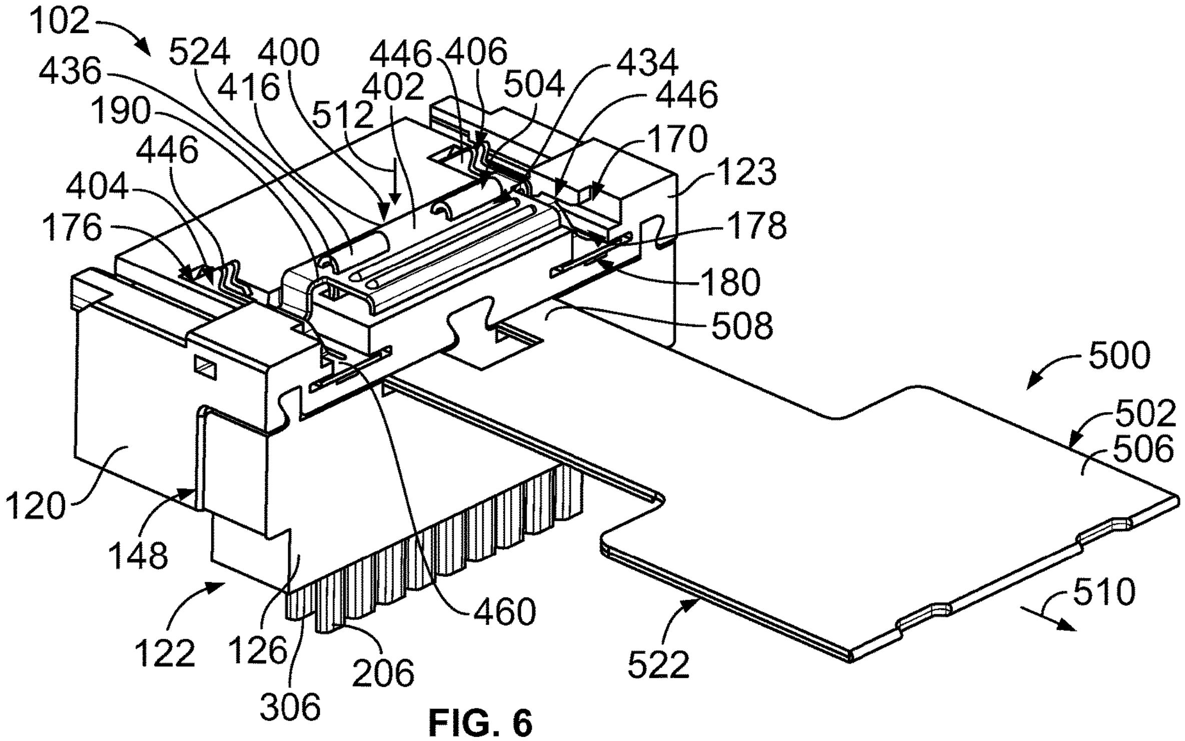
FIG. 6 is a rear perspective view of the plug connector in accordance with an exemplary embodiment showing the latch coupled to the plug housing and showing the pull tab coupled to the latch.
Figure 7:
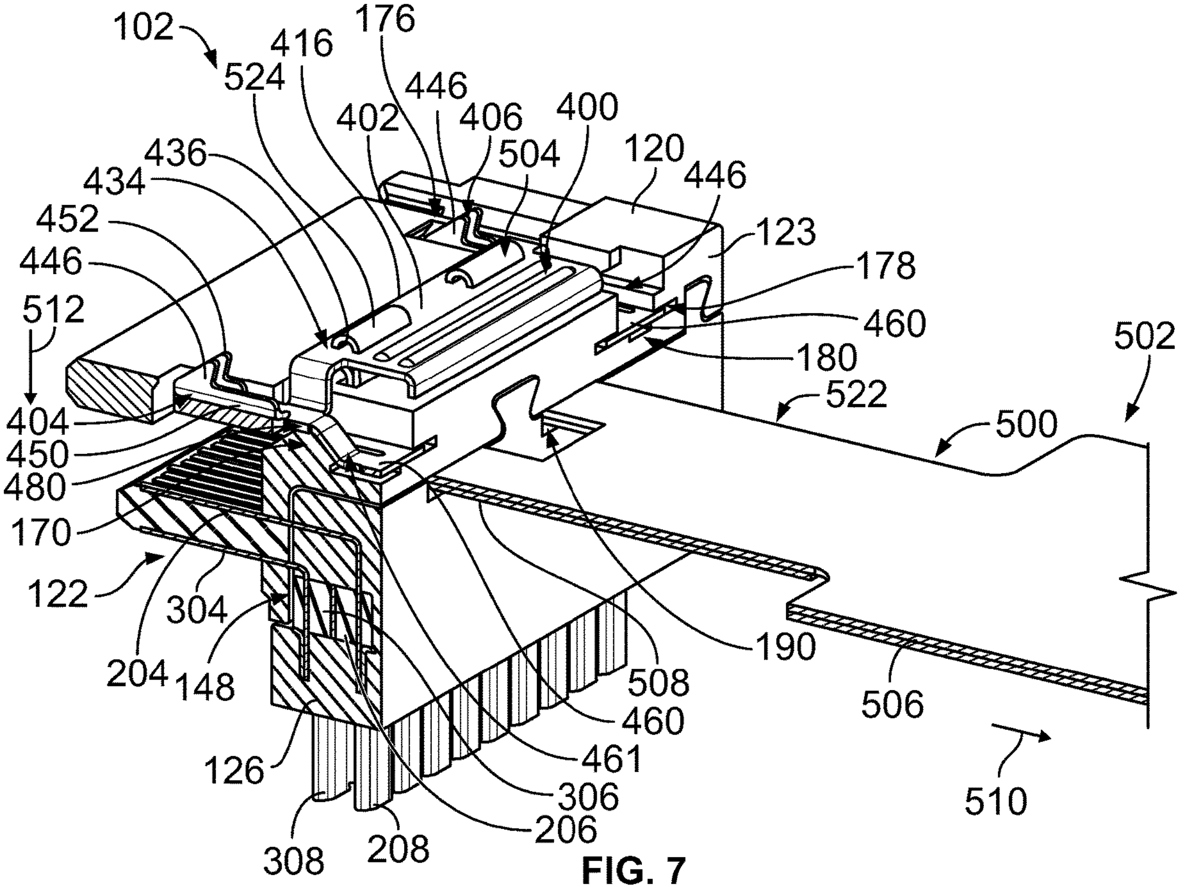
FIG. 7 is a rear perspective, partial sectional view of the plug connector in accordance with an exemplary embodiment sectioned through a portion of the plug housing.
Figure 8:
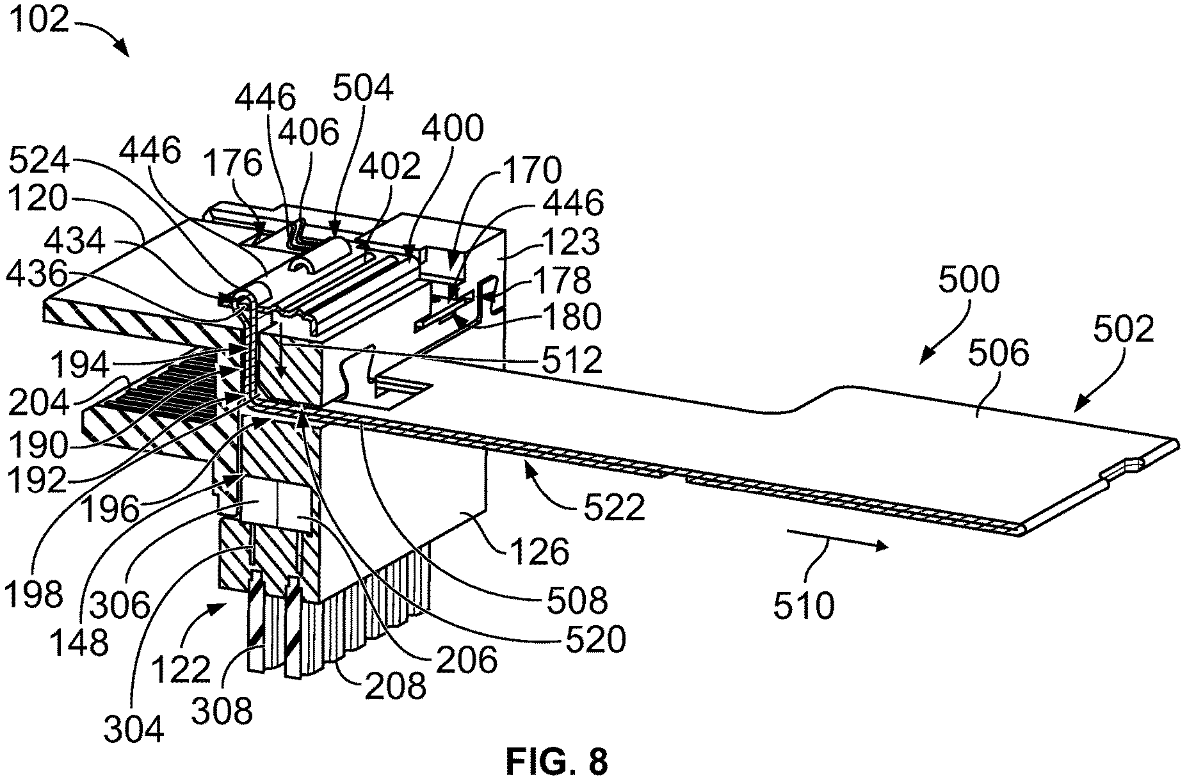
FIG. 8 is a rear perspective, partial sectional view of the plug connector in accordance with an exemplary embodiment sectioned through the latch and pull tab.

FIG. 6 is a rear perspective view of the plug connector 102 in accordance with an exemplary embodiment showing the latch 400 coupled to the plug housing 120 and showing the pull tab 500 coupled to the latch 400. FIG. 7 is a rear perspective, partial sectional view of the plug connector 102 in accordance with an exemplary embodiment sectioned through a portion of the plug connector 102. FIG. 8 is a rear perspective, partial sectional view of the plug connector 102 in accordance with an exemplary embodiment sectioned through the pull tab 500. FIGS. 6-8 illustrate the contact assembly 122 coupled to the plug housing 120. For example, the contact assembly holder 126 is received in the cable chamber 148 and coupled to the plug housing 120.

In an exemplary embodiment, the contact assembly holder 126 includes an overmold body formed in place around the contacts 204, 304 (shown in FIG. 3) and the cables 208, 308. For example, the overmold body may be overmolded over the contacts 204, 304, the contact holders 206, 306 (shown in FIG. 3), and the cables 208, 308. The overmold body provides strain relief for the cables 208, 308. The cables 208, 308 extend vertically downward from the bottom of the plug connector 102.

During assembly, the latch 400 is aligned with the latch chamber 170, such as rearward of the plug housing 120. The latching portions 444 of the latch members 404, 406 are aligned with the latching portion channels 176. The supporting portions 446 of the latch members 404, 406 are aligned with the supporting portion channels 178. During assembly, the latch arms 450 are received in the latching portion channels 176. The securing bases 460 are received in the corresponding base pockets 180. The lances 470 (FIG. 4) are received in the corresponding lance pockets 184 (FIG. 5). The preload tabs 480 (FIG. 4) are received in the corresponding preload windows 186 (FIG. 5).

The pull tab 500 includes a pulling portion 502 and a latch connection portion 504 extending from the pulling portion 502. The latch connection portion 504 is coupled to the main body 402 of the latch 400. In an exemplary embodiment, the pulling portion 502 includes a handle 506 configured to be gripped by the operator to pull on the pull tab 500. The handle 506 may include an opening or finger grips, such as ribs, to enhance pulling by the operator. In an exemplary embodiment, the latch connection portion 504 includes one or more straps 508. The straps 508 are configured to be connected to the latch 400. For example, the straps 508 may be received in the openings 434 and wrapped around the connecting beams 436.

The pull tab 500 extends downward from the main body 402 of the latch 400. The pull tab 500 is configured to be pulled rearward in a rearward pulling direction 510 to pull the latch 400 in a downward latch actuation direction 512. The pull tab 500 is received in the pull tab chamber 190 and extends through an interior of the plug housing 120. For example, the pull tab 500 is located between the plug housing 120 and the contact assembly holder 126. The pulling portion 502 of the pull tab 500 is pulled in the rearward pulling direction 510 to move the latch connection portion 504, and thus the latch 400, in the latch actuation direction 512. In various embodiments, the latch actuation direction 512 is generally perpendicular to the pulling direction 510. The latch connection portion 504 moves the latch 400 in the releasing direction when the pulling portion 502 is pulled in the rearward pulling direction 510 to release the latching tabs 452 from the mating connector. In various embodiments, the latch connection portion 504 is oriented generally vertically and the pulling portion 502 is oriented generally horizontally.

The pull tab 500 transitions between the latch connection portion 504 and the pulling portion 502 within an interior of the plug housing 120. In an exemplary embodiment, the pull tab 500 includes an interior portion 520 (FIG. 8) and an exterior portion 522. The exterior portion 522 is located outside of the plug housing 120, such as extending from the rear 123 of the plug housing 120. The exterior portion 522 includes the handle 506 and may include a portion of the strap 508. The latch connection portion 504 extends from the interior portion 520 opposite the exterior portion 522. The latch connection portion 504 extends from the pull tab chamber 190 and is connected to the main body 402 of the latch 400 at a connection point 524. In an exemplary embodiment, the connection point 524 is located proximate to the front 416 of the main body 402 of the latch. The connection point 524 is located forward of and above the pivot point 461 of the latch (FIG. 7) to rotate the main body 402 and the latch member 404 in the downward latch actuation direction 512. The strap 508 is coupled to the latch 400 and extends initially downward from the latch 400 prior to transitioning rearward to the handle 506. The handle 506 is configured to be pulled rearward to pull the latch 400 downward.

The interior portion 520 extends through the interior of the plug housing 120. For example, the interior portion 520 is received in the pull tab chamber 190. The plug housing 120 includes a transition portion 192 (FIG. 8) between a first channel 194 (FIG. 8) and a second channel 196 (FIG. 8) of the pull tab chamber 190. The first channel 194 may be oriented generally perpendicular to the second channel 196. For example, the first channel 194 may be oriented generally vertically and the second channel 196 may be oriented generally horizontally. The second channel 196 may be formed, at least in part, by the contact assembly holder 126. For example, the contact assembly holder 126 may be located along a bottom of the second channel 196. In an exemplary embodiment, the transition portion 192 includes a corner 198. In various embodiments, the transition portion 192 may be chamfered to allow free movement of the strap 508 within the pull tab chamber 190 along the transition portion 192. The chamfered corner 198 may be curved or angled, such as at 45° relative to the first channel 194 and the second channel 196. The pull tab 500 transitions along the interior corner 198.

Figure 9:
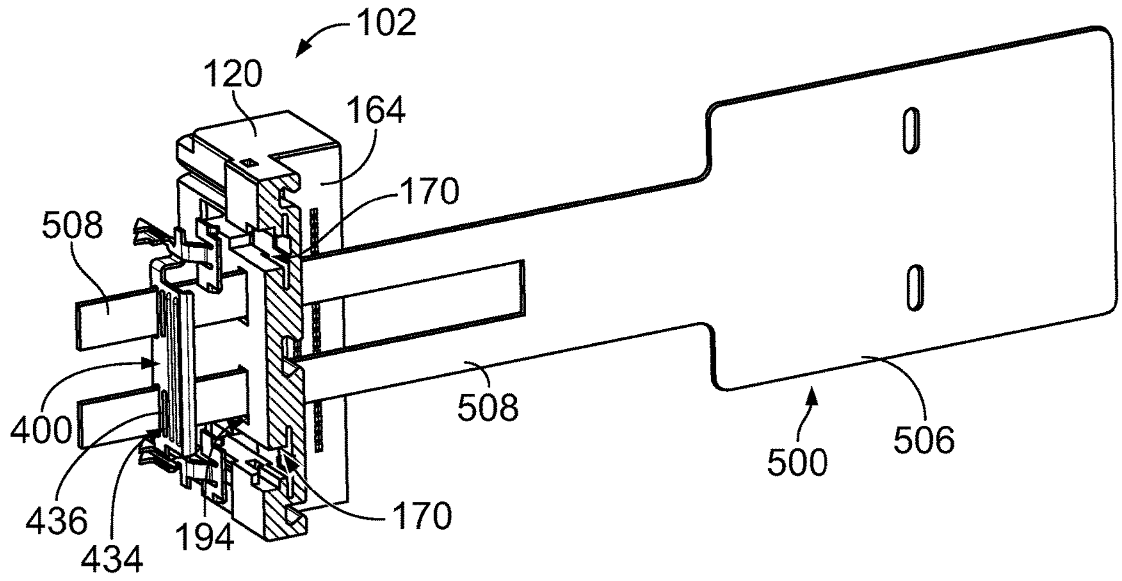
FIG. 9 is an exploded view of a portion of the plug connector in accordance with an exemplary embodiment showing the pull tab partially assembled to the latch and the plug housing.

FIG. 9 is an exploded view of a portion of the plug connector 102 in accordance with an exemplary embodiment showing the pull tab 500 partially assembled to the latch 400 and the plug housing 120. During assembly, ends of the straps 508 are loaded through the channels 194. The ends of the straps are received in the openings 434 and are configured to be wrapped around the connecting beams 436. The ends of the straps 508 may then be fed back through the channels 194 and attached to itself, thus securing the straps 508 to the latch 400. The straps 508 are long enough to allow the latch 400 to be positioned rearward of the plug housing 120 aligned with the latch chamber 170 for loading into the latch chamber 170. After the latch 400 is coupled to the plug housing 120, the straps 508 and the handle 506 may be folded around the corner 198 (shown in FIG. 8) to provide access to the wall 164 for assembling the contact assembly 122 (shown in FIG. 8) to the plug housing 120.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A plug connector comprising:

a plug housing including a mating end and a cable end, the cable end oriented perpendicular to the mating end;

a contact assembly coupled to the plug housing, the contact assembly including an array of contacts, each contact including a mating end and a terminating end, each contact being a right angle contact having the terminating end being perpendicular to the mating end, the mating end configured to be mated with a mating connector, the terminating end configured to be terminated to an end of a conductor of a cable;

a latch coupled to the plug housing, the latch including a main body, a connecting beam extending from the main body, a securing base extending rearward from the connecting beam secured in the plug housing, and a latch member extending forward from the main body connecting beam, the latch member including a latching tab configured to be latchably coupled to the mating connector to secure the plug connector to the mating connector, the latch includes a pivot point; and a pull tab coupled to the main body of the latch at a connection point, the connection point located forward of the pivot point and above the pivot point, the pull tab pulling on the main body at the connection point to pivot the latch at the pivot point to rotate the main body and the latch member in a downward actuation direction, the pull tab being pulled to release the latching tab from the mating connector.

2. The plug connector of claim 1, wherein the main body extends along a latching plane, the pull tab pulling the main body in a latch actuation direction generally perpendicular to the latching plane.

3. The plug connector of claim 1, wherein the latch is located at a top of the plug housing, the pull tab pulling the latch downward.

4. The plug connector of claim 1, wherein the pull tab extends downward from the main body, the pull tab being pulled rearward to pull the latch in the downward actuation direction.

5. The plug connector of claim 1, wherein the pull tab extends through an interior of the plug housing.

6. The plug connector of claim 1, wherein the pull tab includes a latch connection portion connected to the main body of the latch and a pulling portion extending from the latch connection portion, the pulling portion of the pull tab being pulled in a rearward pulling direction to move the latch connection portion in a latch actuation direction generally perpendicular to the pulling direction, the latch connection portion moving the latch in a releasing direction when the pulling portion is pulled in the rearward polling direction to release the latching tab from the mating connector.

7. The plug connector of claim 6, wherein the latch connection portion is oriented generally vertically and the pulling portion is oriented generally horizontally.

8. The plug connector of claim 6, wherein the pull tab transitions between the latch connection portion and the pulling portion within an interior of the plug housing.

9. The plug connector of claim 6, wherein the plug housing includes a pull tab chamber having an interior corner, the pull tab extending through the pull tab chamber and transitioning along the interior corner between the latch connection portion and the pulling portion.

10. The plug connector of claim 1, wherein the plug housing includes a pull tab chamber, the pull tab passing through the pull tab chamber.

11. The plug connector of claim 10, wherein the plug housing includes a transition portion between a first channel and a second channel of the pull tab chamber, the first channel oriented generally perpendicular to the second channel.

12. The plug connector of claim 1, wherein the pull tab includes an interior portion and an exterior portion, the interior portion extending through the plug housing, the exterior portion extending from the plug housing to a handle.

13. The plug connector of claim 12, wherein the pull tab includes a latch connection portion extending from the interior portion opposite the exterior portion, the latch connection portions extending from the plug housing and connected to the main body of the latch.

14. The plug connector of claim 1, wherein the main body includes an opening, the connecting beam extending into the opening, the pull tab having a latch connection portion coupled to the connecting beam.

15. The plug connector of claim 1, wherein the contact assembly includes a contact holder holding the contacts, the contact holder being coupled to the plug housing, the pull tab located between the plug housing and the contact holder.

16. The plug connector of claim 1, wherein the pull tab includes a handle and a strap, the strap coupled to the latch and extending initially downward from the latch and transitioning rearward to the handle, the handle being pulled rearward to pull the latch downward.

17. A plug connector comprising:

a plug housing including a mating end and a cable end, the cable end oriented perpendicular to the mating end, the plug housing including a latch chamber and a pull tab chamber extending from the latch chamber;

a contact assembly coupled to the plug housing, the contact assembly including an array of contacts, each contact including a mating end and a terminating end, each contact being a right angle contact having the terminating end being perpendicular to the mating end, the mating end configured to be mated with a mating connector, the terminating end configured to be terminated to an end of a conductor of a cable;

a latch received in the latch chamber, the latch including a main, a connecting beam extending from the main body, a securing base extending rearward from the connecting beam secured in the plug housing, and a latch member extending forward from the main body connecting beam, the latch member including a latching tab configured to be latchably coupled to the mating connector to secure the plug connector to the mating connector; and a pull tab received in the pull tab chamber, the pull tab extending within an interior of the plug housing, the pull tab coupled to the main body of the latch, the pull tab being pulled to release the latching tab from the mating connector.

18. The plug connector of claim 17, wherein the latch includes a pivot point, the pull tab pulling on the main body to pivot the latch at the pivot point, the pull tab being coupled to the main body at a connection point, the connection point located forward of the pivot point and above the pivot point to rotate the main body and the latch member in a downward actuation direction.

19. A plug connector comprising:

a plug housing including a mating end at a front of the plug housing and a cable end at a bottom of the plug housing, the cable end oriented perpendicular to the mating end, the plug housing including a latch chamber at a top of the plug housing;

a contact assembly coupled to the plug housing, the contact assembly including an array of contacts, each contact including a mating end and a terminating end, each contact being a right angle contact having the terminating end being perpendicular to the mating end, the mating end configured to be mated with a mating connector at the mating end of the plug housing, the terminating end configured to be terminated to an end of a conductor of a cable extending from the cable end of the plug housing;

a latch coupled received at the latch chamber of the plug housing, the latch including a main body, a connecting beam extending from the main body, a securing base extending rearward from the connecting beam secured in the plug housing, and a latch member extending forward from the main body connecting beam, the latch member including a pivot point, the latch member including a latching tab at the top of the plug housing, the latching tab configured to be latchably coupled to the mating connector to secure the plug connector to the mating connector; and a pull tab coupled to the main body of the latch, the pull tab including a latch connection portion connected to the main body of the latch at a connection point, the connection point located forward of the pivot point and above the pivot point, the pull tab including a pulling portion extending from the latch connection portion, the pulling portion of the pull tab being pulled in a rearward pulling direction to rotate the latch connection portion about the pivot point in a latch actuation direction generally perpendicular to the pulling direction, the latch connection portion moving the latch in a releasing direction when the pulling portion is pulled in the rearward pulling direction to release the latching tab from the mating connector.

20. The plug connector of claim 19, wherein the main body extends along a latching plane, the pull tab pulling the main body in a latch actuation direction generally perpendicular to the latching plane.

21. The plug connector of claim 1, wherein the latch member is located at a height below the main body, the latch member including a securing base secured in the plug housing, the securing base located at a height below the latch member.

22. The plug connector of claim 17, wherein the latch member is located at a height below the main body, the latch member including a securing base secured in the plug housing, the securing base located at a height below the latch member.

* * * * *